(12) United States Patent
Butterfield (10) Patent No.: US 9,239,806 B2
(45) Date of Patent: Jan. 19, 2016

(54) SYSTEMS, DEVICES, MEMORY CONTROLLERS, AND METHODS FOR CONTROLLING MEMORY

(75) Inventor: Jeremy W. Butterfield, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 343 days.

(21) Appl. No.: 13/046,439

(22) Filed: Mar. 11, 2011

(65) Prior Publication Data
US 2012/0233380 A1 Sep. 13, 2012

(51) Int. Cl.
*G06F 13/16* (2006.01)

(52) U.S. Cl.
CPC ............ *G06F 13/16* (2013.01); *G06F 13/1668* (2013.01); *G06F 13/1694* (2013.01)

(58) Field of Classification Search
CPC .. G06F 13/16; G06F 13/1694; G06F 13/1668
USPC .......................................... 711/154; 713/323
See application file for complete search history.

(56) References Cited

U.S. PATENT DOCUMENTS

| | | | |
|---|---|---|---|
| 4,430,724 A * | 2/1984 | Hamilton et al. | 710/305 |
| 5,056,015 A | 10/1991 | Baldwin et al. | |
| 6,338,113 B1 | 1/2002 | Kubo et al. | |
| 6,618,791 B1 | 9/2003 | Dodd et al. | |
| 6,834,322 B2 | 12/2004 | Sukegawa | |
| 7,145,815 B2 | 12/2006 | Janzen | |
| 7,269,082 B2 | 9/2007 | Naito | |
| 7,755,947 B2 | 7/2010 | Fujita et al. | |
| 7,778,057 B2 | 8/2010 | McCarthy et al. | |
| 7,831,742 B2 | 11/2010 | Bernardi | |
| 7,864,622 B2 | 1/2011 | Sohn et al. | |
| 8,225,052 B2 | 7/2012 | Galbo et al. | |
| 2001/0003837 A1 | 6/2001 | Norman et al. | |
| 2006/0126404 A1 | 6/2006 | Sohn et al. | |
| 2008/0140916 A1 | 6/2008 | Oh et al. | |
| 2008/0320214 A1 | 12/2008 | Ma et al. | |
| 2009/0230989 A1 | 9/2009 | Murayama | |
| 2010/0070693 A1 * | 3/2010 | Conley | 711/103 |
| 2010/0082884 A1 | 4/2010 | Chen et al. | |

(Continued)

FOREIGN PATENT DOCUMENTS

| | | |
|---|---|---|
| CN | 1815722 | 8/2006 |
| CN | 101506895 | 8/2009 |

(Continued)

OTHER PUBLICATIONS

International Search Report and Written Opinion for related PCT Application No. PCT/US2012/028049, mailed Sep. 25, 2012, (14 pgs.).

(Continued)

*Primary Examiner* — Gary W Cygiel (74) *Attorney, Agent, or Firm* — Brooks, Cameron & Huebsch, PLLC (57) ABSTRACT

Systems, devices, memory controllers, and methods for controlling memory are described. One such method includes activating a memory unit of a memory device; after activating the memory unit, providing a command to the memory device; and returning the memory unit to a previous state if the command does not indicate a target memory volume, wherein the memory unit remains active if the command indicates a target memory volume associated with the memory unit.

24 Claims, 6 Drawing Sheets

(56) References Cited

U.S. PATENT DOCUMENTS

| | | | |
|---|---|---|---|
| 2010/0174851 | A1 | 7/2010 | Leibowitz et al. |
| 2010/0232197 | A1 | 9/2010 | Park |
| 2010/0246280 | A1 | 9/2010 | Kanda |
| 2010/0250826 | A1 | 9/2010 | Jeddeloh |
| 2010/0259980 | A1 | 10/2010 | Futatsuyama |
| 2011/0055604 | A1* | 3/2011 | Jackson ................ 713/320 |

FOREIGN PATENT DOCUMENTS

| | | |
|---|---|---|
| EP | 1981031 | 10/2008 |
| JP | H11-353228 | 12/1999 |
| JP | 2000315185 | 11/2000 |
| JP | 2006172700 | 6/2006 |
| JP | 2006516059 | 6/2006 |
| JP | 2010519626 | 6/2010 |
| JP | 2014509025 | 4/2014 |
| TW | 201104436 | 2/2011 |
| TW | 201104438 | 2/2011 |
| WO | 2008022454 | 2/2008 |
| WO | 2008101246 | 8/2008 |

OTHER PUBLICATIONS

Grunzke, ONFI 3.0 The Path to 400MT/s NAND Interface Speeds, Flash Memory Summit, Santa Clara, California, http://www.flashmemorysummit.com/English/Collaterals/Proceesings/2010/20100818_S104_Grunzke.pdf, accessed from web-site Jan. 20, 2010 (17 pgs.).

Terry Grunzke, Line Termination Methods and Apparatus, filed Aug. 13, 2010 as U.S. Appl. No. 12/856,000 (32 pgs.).

Abraham, et al., Data Signal Mirroring, filed Mar. 11, 2011 as U.S. Appl. No. 13/046,420 (22 pgs.).

Feeley, et al, Copyback Operations, filed Mar. 11, 2011 as U.S. Appl. No. 13/046,427 (23 pgs.).

Grunzke, Systems, Devices, Memory Controllers, and Methods for Memory Initialization, filed Mar. 11, 2011 as U.S. Appl. No. 13/046,446 (27 pgs.).

ONFI Workgroup, Open NAND Flash Interface Specification Revision 3.0, ONFI Workgroup, Published Mar. 15, 2011 (288 pgs.).

Nobunaga, Method and Apparatus for Addressing Memory Arrays, filed Mar. 11, 2011 as U.S. Appl. No. 13/046,248 (29 pgs.).

Office Action for related Taiwan Patent Application No. 101107757, dated Jun. 13, 2014, 26 pages.

Notice of Rejection for related Japan Patent Application No. 557825, dated Sep. 9, 2014, 8 pages.

Notice of Rejection for related Korea Patent Application No. 10-2013-7026565, dated Oct. 12, 2014, 12 pages.

Office Action for related Taiwan Patent Application No. 101107757, dated Dec. 5, 2014, 7 pages.

Supplementary European Search Report and Written Opinion for related EP Patent Application No. 12758369.8, dated Mar. 9, 2015, 5 pages.

Office Action for related China Patent Application No. 201280012921.9, dated May 6, 2015, 32 pages.

* cited by examiner

Fig. 6

SYSTEMS, DEVICES, MEMORY CONTROLLERS, AND METHODS FOR CONTROLLING MEMORY

TECHNICAL FIELD

The present disclosure relates generally to semiconductor memory systems, devices, and methods, and more particularly, to systems, devices, memory controllers, and methods for controlling memory.

BACKGROUND

Memory devices are typically provided as internal, semiconductor, integrated circuits in computers or other electronic devices. There are many different types of memory including volatile and non-volatile memory. Volatile memory can require power to maintain its information and includes random-access memory (RAM), dynamic random access memory (DRAM), and synchronous dynamic random access memory (SDRAM), among others. Non-volatile memory can provide persistent information by retaining stored information when not powered and can include NAND flash memory, NOR flash memory, read only memory (ROM), Electrically Erasable Programmable ROM (EEPROM), Erasable Programmable ROM (EPROM), phase change random access memory (PCRAM), resistive random access memory (RRAM), and magnetic random access memory (MRAM), such as spin torque transfer random access memory (STT RAM), among others.

Memory devices can be combined together to form a solid state drive (SSD). A solid state drive can include non-volatile memory (e.g., NAND flash memory and NOR flash memory), and/or can include volatile memory (e.g., DRAM and SRAM), among various other types of non-volatile and volatile memory. An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include one or more discrete memory devices (e.g., packages), which can be multi-chip packages (MCPs). A MCP can include a number of memory dies and/or chips each having one or more memory units associated therewith. The memory units can execute commands received from a host, report status to the host, and can include one or more memory arrays along with peripheral circuitry. The memory arrays can include memory cells that can be organized into a number of physical groups (e.g., blocks), with each of the groups capable of storing multiple pages of data.

In various memory systems, multiple memory devices are coupled to a system controller via a shared bus. The system controller can regulate performance of various operations such as erase operations, program operations, and read operations, for example. The interaction between the system controller and the multiple memory devices can affect various characteristics of a memory system including power consumption, processing speed, and/or data integrity, among other memory system characteristics.

DETAILED DESCRIPTION

The present disclosure includes systems, devices, memory controllers, and methods for controlling memory. One such method includes activating a memory unit of a memory device; after activating the memory unit, providing a command to the memory device; and returning the memory unit to a previous state if the command does not indicate a target memory volume, wherein the memory unit remains active if the command indicates a target memory volume associated with the memory unit.

Embodiments of the present disclosure can provide various benefits such as reducing interaction between a memory system controller and memory devices coupled to the system controller via a shared bus in association with various memory operations as compared to prior memory systems, devices, and methods, among other benefits. As an example, reducing the interaction between the system controller and the memory devices can reduce power consumption associated with operating the memory system.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," and "M," particularly with respect to reference numerals in the drawings, indicates that a number of the particular feature so designated can be included with one or more embodiments of the present disclosure. As used herein, "a number of" something can refer to one or more of such things.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Figure 1:
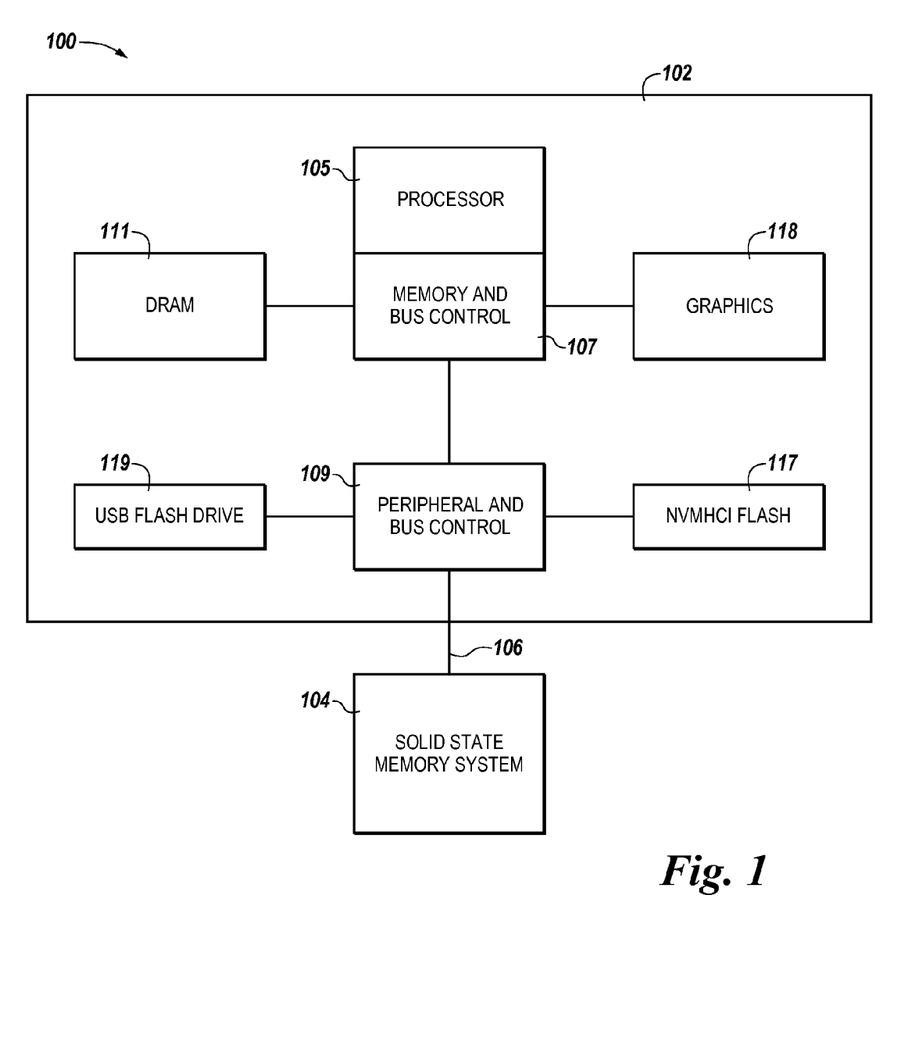
FIG. 1 is a block diagram of a computing system in accordance with one or more embodiments of the present disclosure.

FIG. 1 is a functional block diagram of a computing system 100 in accordance with a number of embodiments of the present disclosure. Computing system 100 includes a memory system 104, for example a number of solid state drives (SSDs), communicatively coupled to host 102. Memory system 104 can be communicatively coupled to the host 102 through an interface 106, such as a backplane or bus, for instance.

Examples of hosts 102 can include laptop computers, personal computers, digital cameras, digital recording and playback devices, mobile telephones, PDAs, memory card readers, and interface hubs, among other host systems. The interface 106 can include a serial advanced technology attachment (SATA), peripheral component interconnect express (PCIe), or a universal serial bus (USB), among other connectors and interfaces. In general, however, host interface 106 can provide an interface for passing control, address, data, and other signals between the memory system 104 and the host 102.

Host 102 can include a number of processors 105 (e.g., parallel processors, co-processors, etc.) communicatively coupled to a memory and bus control 107. The processor 105 can be a number of microprocessors, or some other type of controlling circuitry, such as a number of application-specific integrated circuits (ASICs), for example. Other components of the computing system 100 may also have processors. The memory and bus control 107 can have memory and other components directly communicatively coupled thereto, for example, dynamic random access memory (DRAM) 111, graphic user interface 118, and/or other user interface (e.g., display monitor, keyboard, mouse, etc.).

The memory and bus control 107 can also have a peripheral and bus control 109 communicatively coupled thereto, which in turn, can connect to a number of devices, such as a flash drive 119 using a universal serial bus (USB) interface, for example, a non-volatile memory host control interface (NVMHCI) flash memory 117, and/or the memory system 104. As the reader will appreciate, the memory system 104 can be used in addition to, or in lieu of, a hard disk drive (HDD) in a number of different computing systems. The computing system 100 illustrated in FIG. 1 is one example of such a system; however, embodiments of the present disclosure are not limited to the configuration shown in FIG. 1.

Enterprise solid state storage appliances are a class of memory systems that can currently be characterized by terabytes of storage and fast performance capabilities, for example 100 MB/sec, 100 K inputs/outputs per second (IOPS), etc. According to a number of embodiments of the present disclosure, an enterprise solid state storage appliance can be configured using solid state drive (SSD) components. For example, with respect to FIG. 1, the memory system 104 may be an enterprise solid state storage appliance implemented using a number of component SSDs, the number of SSDs being operated as a memory system by a memory system controller (e.g., memory system controller 215 shown in FIG. 2).

Figure 2:
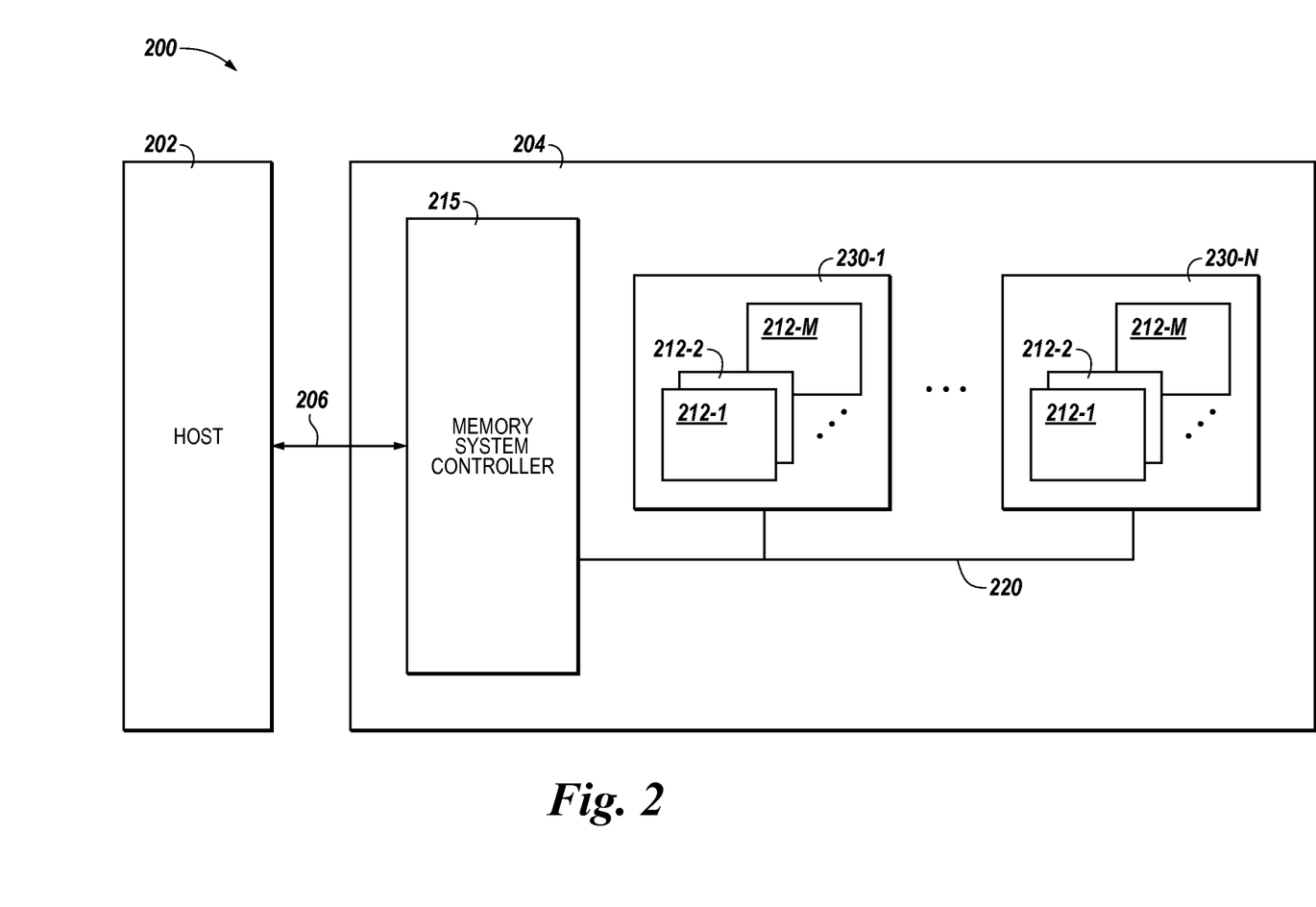
FIG. 2 is a block diagram of a portion of a system configured to control memory in accordance with one or more embodiments of the present disclosure.

FIG. 2 is a block diagram of a portion of a system 200 configured to control memory in accordance with a number of embodiments of the present disclosure. The system 200 includes a memory system 204, which can be a SSD, for example. The memory system 204 can be coupled to a host 202 via a host interface 206 and can include a memory system controller 215 (e.g., memory control circuitry, firmware, and/or software), and a number of memory devices 230-1, . . . , 230-N coupled to the system controller 215. In a number of embodiments, the memory controller 215 can be an application specific integrated circuit (ASIC) coupled to a printed circuit board.

The memory system 204 includes a bus 220 to send/receive various signals (e.g., data signals, control signals, and/or address signals), between the memory devices 230-1, . . . , 230-N and the system controller 215. Although the example illustrated in FIG. 2 includes a single bus 220, the memory system 204 can include a separate data bus (DQ bus), control bus, and address bus, in some embodiments. The bus 220 is shared by the number of memory devices 230-1, . . . , 230-N and can have various types of bus structures including, but not limited to, bus structures related to Open NAND Flash Interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

As illustrated in FIG. 2, the memory devices 230-1, . . . , 230-N can comprise a number of dies and/or chips that can include a number of memory units 212-1, 212-2, . . . , 212-M providing a storage volume for the memory system 204. The memory units 212-1, 212-2, . . . , 212-M can be referred to as logical units (LUNs) and can include a number of memory arrays along with peripheral circuitry thereon. In a number of embodiments, the memory units 212-1, 212-2, . . . , 212-M can be the minimum component of memory system 204 capable of independently executing commands from and reporting status to the memory system controller 215 and/or host 202 via bus 220. The memory units 212-1, 212-2, . . . , 212-M can include Flash memory arrays having a NAND architecture, for example. However, embodiments are not limited to a particular type of memory array or array architecture.

As described further below in connection with FIGS. 3-6, the memory units 212-1, 212-2, . . . , 212-M within the memory devices 230-1, . . . , 230-N can be organized into a number of target volumes. In a number of embodiments, each target volume can be a set of memory units that share an enable signal (e.g., a chip enable (CE) signal received from controller 215) within one of the memory devices 230-1, . . . , 230-N. For instance, a number of enable terminals (e.g., pins) associated with the memory devices 230-1, . . . , 230-N can be coupled together and may be coupled to one enable terminal (e.g., pin) of the controller 215. As such, a single chip enable pin of the controller may be shared by a number of the memory devices 230-1, . . . , 230-N, in various embodiments.

As one of ordinary skill in the art will appreciate, the state of a chip enable signal can be used to activate/deactivate a memory unit. For example, a memory system can be configured such that memory units are active low (e.g., the memory units can process commands received from the system controller when the chip enable signal is in a low state). For active low memory units, the memory units become inactive (e.g., deselected) and cannot process commands when the chip enable signal is in a high state. Embodiments of the present disclosure are not limited to memory units having a particular chip enable configuration. As used herein, activating a memory unit can include activating a target memory volume and/or a memory device associated with a memory unit.

The target volume(s) within the memory devices 230-1, . . . , 230-N can have volume addresses assigned (e.g., appointed) thereto. The assigned volume addresses can be used to distinguish among target volumes associated with a shared chip enable signal, as described further below.

Figure 3:
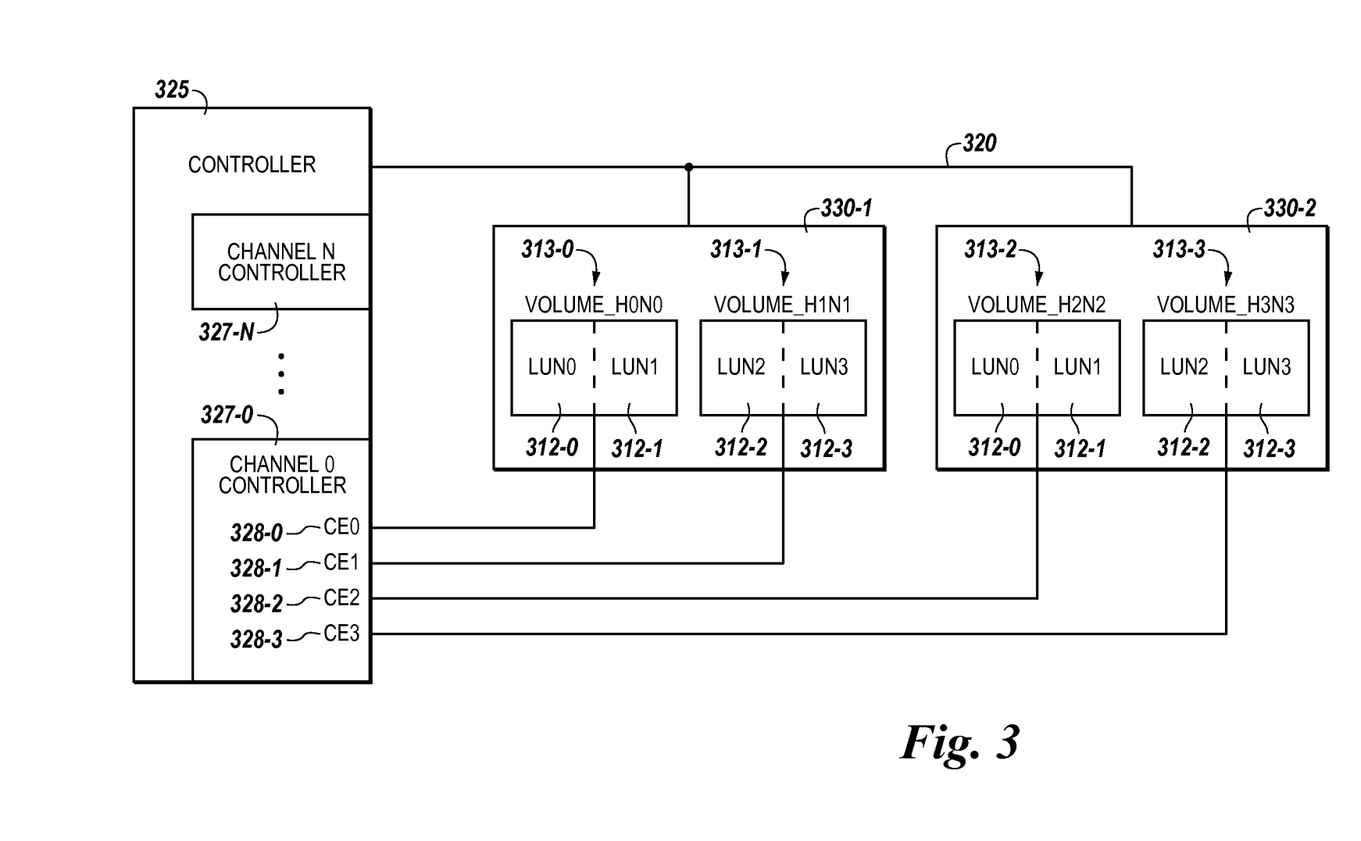
FIG. 3 is a block diagram of a portion of a system configured to control memory in accordance with one or more embodiments of the present disclosure.

FIG. 3 is a block diagram of a portion of a system configured to control memory in accordance with a number of embodiments of the present disclosure. The memory system illustrated in FIG. 3 includes a system controller 325. The system controller 325 can control access across a number of memory channels. In this example, the controller 325 includes a number of channel controllers 327-0, . . . , 327-N each controlling access to a respective memory channel.

In the example shown in FIG. 3, the system controller 325 is coupled to a first memory device 330-1 and a second memory device 330-2 via a bus 320 (e.g., a shared data, address, and control bus). Each of the memory devices 330-1 and 330-2 includes 4 memory units 312-0 to 312-3. The memory units 312-0 to 312-3 can be memory die and the memory devices 330-1 and 330-2 can be multi-chip packages, as an example. In this example, the memory units 312-0 to 312-3 within each memory device are organized (e.g., grouped) into two target volumes, with each of the memory units of a target volume sharing a chip enable pin. For instance, memory units 312-0 and 312-1 comprise target volume 313-0 and memory units 312-2 and 312-3 comprise target volume 313-1 within memory device 330-1. Similarly, memory units 312-0 and 312-1 comprise target volume 313-2 and memory units 312-2 and 312-3 comprise target volume 313-3 within memory device 330-2.

In this example, the system controller includes four CE pins 328-0 (CE0), 328-1 (CE1), 328-2 (CE2), and 328-3 (CE3) dedicated to providing CE signals to the memory devices 330-1 and 330-2. For instance, CE0 is coupled to a CE pin associated with target volume 313-0 within memory device 330-1, CE1 is coupled to a CE pin associated with target volume 313-1 within memory device 330-1, CE2 is coupled to a CE pin associated with target volume 313-2 within memory device 330-2, and CE3 is coupled to a CE pin associated with target volume 313-3 within memory device 330-2.

One of ordinary skill in the art will appreciate that although the CE pins are shown separately, the controller 325 and memory devices 330-1 and 330-2 have various other pins connected via signal lines, for instance, which can be part of bus 320. Although not shown in FIG. 3, each of the channel controllers 327-0 to 327-N can be coupled to a number of memory devices (e.g., two in this example). Embodiments are not limited to the example shown in FIG. 3. For instance, the memory system can include more or fewer than two memory devices per channel, more or fewer than two target memory volumes per memory device, etc.

In the example illustrated in FIG. 3, each of the target memory volumes 313-0 to 313-3 has an assigned volume address associated therewith. As described further below in connection with FIG. 6, a command provided (e.g., issued) by the controller 325 can indicate (e.g., specify) a volume address of a particular one of the target memory volumes to receive a number of subsequent commands (e.g., the next command) from the controller. The command indicating the particular target volume address is received by each of the memory devices coupled to the shared bus 320. In various embodiments, those memory units and/or associated target volumes not specified by the command revert to an unselected state. As used herein, an unselected state can be, for example, an inactive state or a "snooping" (e.g., sniff) state, as described further below. In a number of embodiments, those memory units and/or associated target volumes not specified by the command revert to their previous states. For instance, a memory unit of the target memory volume specified by the command remains active and the memory units associated with the remaining target memory volumes return to their previous unselected states. For instance, when the controller 325 wants to maintain interaction with a target volume (e.g., with a particular memory unit associated with a target volume) within a particular one of the memory devices 330-1 and 330-2 coupled to the shared bus 320, those memory devices including unselected volumes can revert to an unselected state. Depending on which target volume is selected and/or how the system is configured, the memory units of the unselected memory devices may return to their previous states, switch from an inactive state to a snooping state, switch from a sniff state to an inactive state, or switch from the active state to the inactive state or sniff state.

Figure 4:
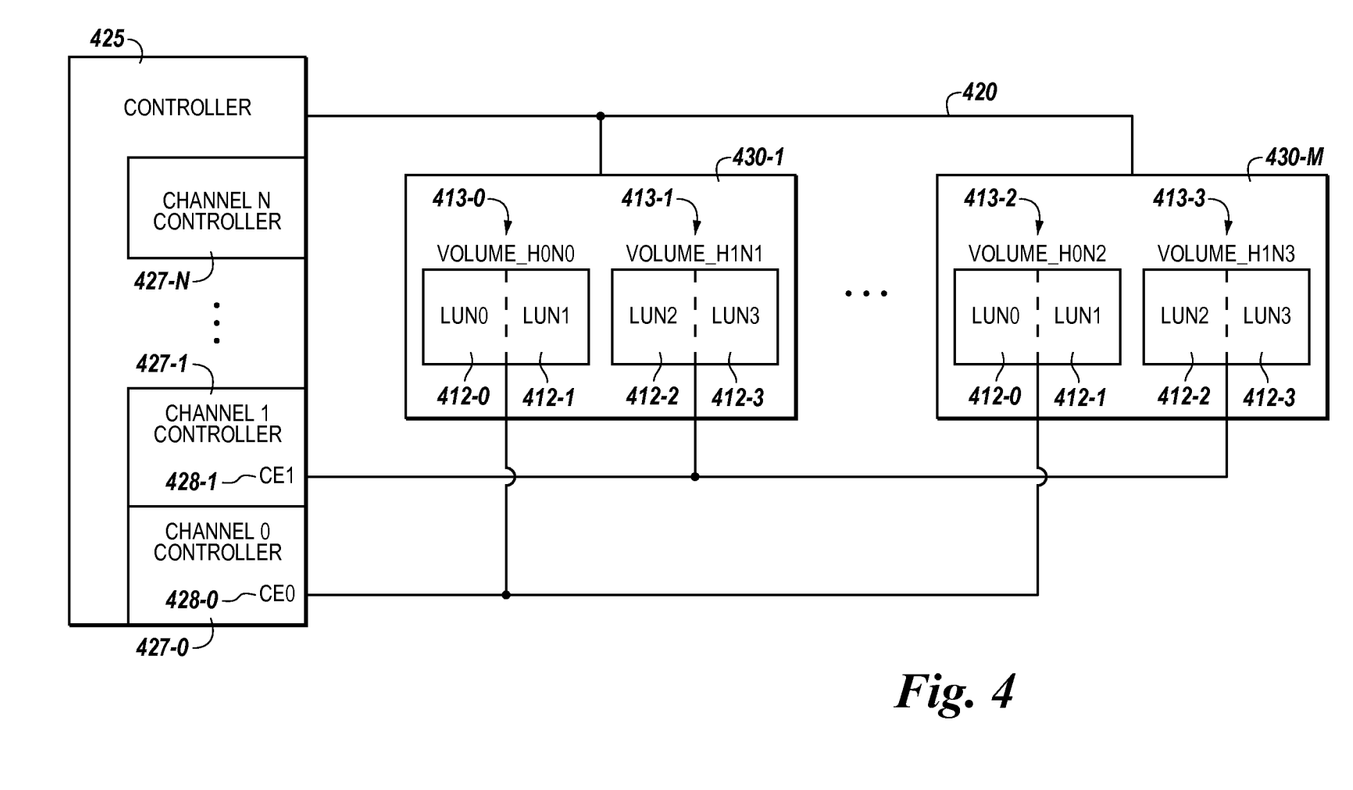
FIG. 4 is a block diagram of a portion of a system configured to control memory in accordance with one or more embodiments of the present disclosure.

FIG. 4 is a block diagram of a portion of a system configured to control memory in accordance with a number of embodiments of the present disclosure. The embodiment illustrated in FIG. 4 can provide reduced pin counts as compared with the memory system illustrated in FIG. 3. The memory system illustrated in FIG. 4 includes a system controller 425. The system controller 425 can control access across a number of memory channels. In this example, the controller 425 includes a number of channel controllers 427-0, 427-1, . . . , 427-N each controlling access to a respective memory channel.

In the example shown in FIG. 4, the channel controller 425 is coupled to a number of memory devices 430-1, . . . , 430-M via a bus 420 (e.g., a data, address, and control bus). In this embodiment, each of the memory devices 430-1, . . . , 430-M includes 4 memory units 412-0 to 412-3. Similar to the system described in FIG. 3, in this example, the memory units 412-0 to 412-3 within each memory device are organized into two target volumes, with each of the memory units of a target volume sharing a chip enable pin. For instance, memory units 412-0 and 412-1 comprise target volume 413-0 and memory units 412-2 and 412-3 comprise target volume 413-1 within memory device 430-1. Similarly, memory units 412-0 and 412-1 comprise target volume 413-2 and memory units 412-2 and 412-3 comprise target volume 413-3 within memory device 430-M.

In this example, the system controller 425 includes two CE pins 428-0 (CE0) and 428-1 (CE1) dedicated to providing CE signals to the memory devices 430-1 to 430-M. For instance, CE0 is coupled to a CE pin associated with target volume 413-0 within memory device 430-1 and a CE pin associated with target volume 413-2 within memory device 430-M. Also, CE1 is coupled to a CE pin associated with target volume 413-1 within memory device 430-1 and a CE pin associated with target volume 413-3 within memory device 430-M. As such, a single chip enable signal provided via a single chip enable pin of the controller 425 can be shared by multiple target memory volumes across a number of memory devices coupled to a common bus 420.

Figure 5:
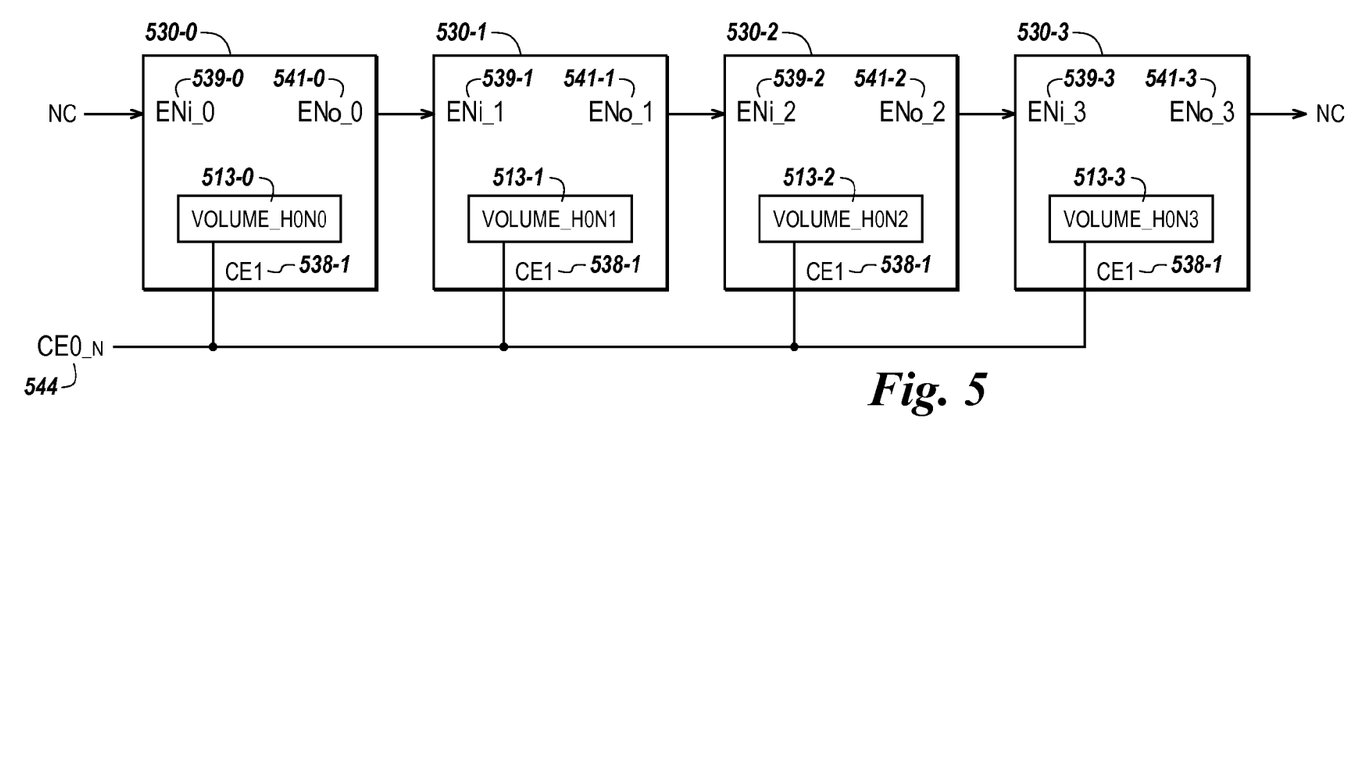
FIG. 5 is a block diagram of a portion of a system configured to control memory in accordance with one or more embodiments of the present disclosure.

FIG. 5 is a block diagram of a portion of a system configured to control memory in accordance with a number of embodiments of the present disclosure. The embodiment illustrated in FIG. 5 includes a number of memory devices 530-0, 530-1, 530-2, and 530-3 and illustrates an example topology for controlling memory in accordance with a number of embodiments of the present disclosure. The memory devices 530-0, 530-1, 530-2, and 530-3 can each be single memory volume devices; however, embodiments are not so limited. As an example, the memory devices 530-0, 530-1, 530-2, and 530-3 can be NAND memory devices.

In the example illustrated in FIG. 5, each of the devices 530-0, 530-1, 530-2, and 530-3 includes an input pin 539 and an output pin 541. For instance, device 530-0 includes input pin 539-0 (ENi_0) and output pin 541-0 (ENo_0), device 530-1 includes input pin 539-1 (ENi_1) and output pin 541-1 (ENo_1), device 530-2 includes input pin 539-2 (ENi_2) and output pin 541-2 (ENo_2), and device 530-3 includes input pin 539-3 (ENi_3) and output pin 541-3 (ENo_3).

As illustrated, the input pins 539 and output pins 541 of the memory devices 530-0, 530-1, 530-2, and 530-3 can be coupled to create a daisy chain configuration. In this example, the input pin 539-0 of the first device 530-0 in the chain and the output pin 541-3 of the last device 530-3 in the chain are not connected (NC). The input pins 539 of the other devices are connected to the output pin 541 of the previous device in a daisy chain configuration as shown in FIG. 5. Embodiments of the present disclosure are not limited to the topology illustrated in FIG. 5. For instance, embodiments are not limited to a daisy chain topology.

As illustrated in FIG. 5, and as described above in connection with FIG. 4, each of the memory devices 530-0, 530-1, 530-2, and 530-3 share a common CE pin from a system controller (e.g., system controller 425 shown in FIG. 4). For instance, a chip enable signal 544 (CE0_N) from a system controller is shared by the chip enable pin 538-1 (CE1) of each of the memory devices 530-0, 530-1, 530-2, and 530-3. The CE1 pin of each of the memory devices 530-0, 530-1, 530-2, and 530-3 is associated with (e.g., corresponds to) a particular target memory volume 513-0, 513-1, 513-2, 513-3. As described above, a target volume can refer to a number of memory units (e.g., LUNs) that share a particular CE signal within a memory device. Each of the target volumes can be assigned a volume address. In this example, target volume 513-0 is assigned volume address H0N0, target volume 513-1 is assigned volume address H0N1, target volume 513-2 is assigned volume address H0N2, and target volume 513-3 is assigned volume address H0N3. In a number of embodiments, the volume addresses can be assigned to particular target volumes upon initialization of the memory system.

In operation, the states of the input pins 539-0, 539-1, 539-2, and 539-3 and of the chip enable pin 538-1 (e.g., based on the state of chip enable signal 544) determines whether the respective memory device 530-0, 530-1, 530-2, and 530-3 is able to accept commands. For example, if the input pin 539 of a particular device is high and the CE pin 538-1 of the device is low, then the particular device can accept commands. If the enable input of the particular device is low or the CE pin 538-1 is high, then the device cannot accept commands.

In a number of embodiments, a system controller can issue a command indicating a target volume address of a particular target volume to process a number of subsequent commands. For instance, a volume select command can be issued by the system controller to the number of memory devices 530-0, 530-1, 530-2, and 530-3 (e.g., via a shared bus) in order to select a particular target volume (e.g., 513-0, 513-1, 513-2, 513-3) sharing a particular chip enable signal 544 from the system controller. In this manner, volume addressing can be used to access particular target volumes of the memory devices 530-0, 530-1, 530-2, and 530-3.

In a number of embodiments, a chip enable signal (e.g., chip enable signal 544) received from a system controller (via a shared bus such as shared bus 420 shown in FIG. 4) is used to activate a number of memory units in memory devices (e.g., 530-0, 530-1, 530-2, and 530-3). For example, assuming the memory units in memory devices 530-0, 530-1, 530-2, and 530-3 are active low, they can be activated responsive to detecting the chip enable signal 544 switching from a first state to a second state (e.g., from a high to a low state).

A command can subsequently be provided to the activated number of memory units in memory devices 530-0, 530-1, 530-2, and 530-3. In a number of embodiments, the command can indicate (e.g., via a target memory volume address) a target memory volume of the number of target memory volumes (e.g., 513-0, 513-1, 513-2, 513-3) within a particular one of the number of memory devices 530-0, 530-1, 530-2, and 530-3. The target memory volume indicated by the command remains active (e.g., selected) and, if that volume was active in its previous state, the remaining memory volumes return to their previous states (e.g., their respective unselected states prior to activation responsive to detecting the switching of the chip enable signal).

If the command received subsequent to activation responsive to switching of the chip enable signal does not indicate a target volume (e.g., the command is not a volume select command), then each of the memory devices 530-0, 530-1, 530-2, and 530-3 and target memory volumes therein return to their previous states. As such, a previously selected one of the number of memory volumes (e.g., the memory volume which was selected prior to detecting the switching of the enable signal) will remain selected. Also, those memory volumes which were previously unselected will return to an unselected state. As described further below, an unselected state may include, for example, an inactive state or a "snooping" (e.g., sniff) state (e.g., if an on die termination function is enabled), in a number of embodiments. On die termination (ODT) refers to the use of a number of memory units (e.g., die) to perform termination for a number of signal lines of a shared bus. ODT can improve signal integrity associated with signals across shared busses. As an example, a number of memory units can be assigned as terminators for particular memory volumes such that the number of memory units perform termination functions when the particular memory volume is selected. As an example, when a particular volume is selected, the memory units assigned as terminators for that particular volume can enter a sniff state in which they monitor commands provided to the selected volume. The memory units assigned as terminators can activate upon detection of a particular operation (e.g., a read command, a write command, etc.) in order to perform a termination function. The memory unit can then return to a sniff state such that it does not remain active. Maintaining memory volumes in a sniff state can reduce system power usage as compared to maintaining the memory volumes in an active state, among other benefits.

Figure 6:
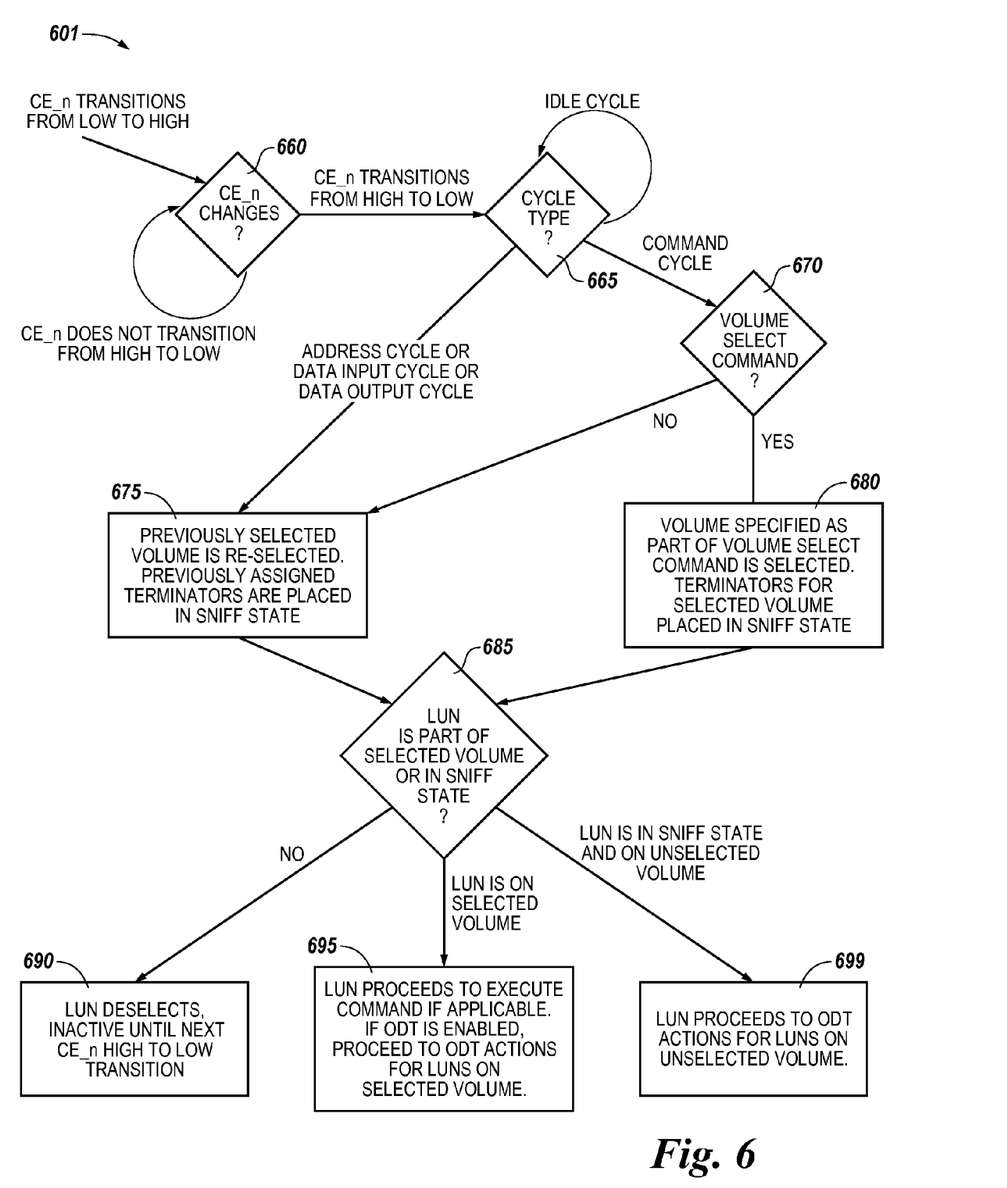
FIG. 6 is a flow chart illustrating a method for controlling memory in accordance with one or more embodiments of the present disclosure.

FIG. 6 is a flow chart illustrating a method 601 for controlling memory in accordance with a number of embodiments of the present disclosure. The method 601 can be applied to various memory systems such as those described above in FIGS. 1-5. As an example, the method 601 can apply to a number of memory devices coupled to a system controller via a shared bus. In this example, the number of memory devices share a chip enable signal (CE_n) from the system controller and are active low (e.g., the memory units of the devices activate upon detection of a low signal state of the chip enable signal). The memory units (e.g., LUNs) are each capable of independently executing commands and reporting status to the system controller. In a number of embodiments, volume addresses can be assigned to target memory volumes within the memory devices. A target memory volume can include a number of memory units sharing a chip enable signal within a memory device (e.g., a package). In a number of embodiments, the volume addresses can be assigned to the target memory volumes upon initialization of the system (e.g., upon power up). The assigned volume addresses can be maintained across reset commands, in a number of embodiments, and different volume addresses can be assigned to the target memory volumes upon a subsequent system initialization.

For the method 601, the memory units sharing a chip enable signal can each enter an inactive (e.g., deselected) state from a previous state due to a transition of the shared chip enable signal from a low to high state. As an example, prior to the chip enable signal transition to the high state, one of the memory volumes (and, therefore, a number of memory units) on the shared bus would be active (e.g., due to a low chip enable signal received thereto) and being used by the system controller (e.g., processing commands from the controller). Upon transition of the chip enable signal from the low to high state, the previously active memory volume and each other memory volume sharing the chip enable signal would be deactivated. As illustrated at block 660, the memory volumes wait for a switching of the chip enable signal from the high (e.g., inactive) to low (e.g., active) state.

As illustrated at block 665, upon detection of a switching (e.g., transition) of the chip enable signal from the high to the low state, the memory volumes sharing the chip enable signal activate and determine a cycle type (e.g., command, address, or data) of the next cycle issued by the system controller. In a number of embodiments, the previously selected memory volume (e.g., the memory volume which was active and being used by the controller prior to the transition of the chip enable signal to the high state) is reselected (and the remaining memory volumes are deselected) unless the cycle is a command cycle (e.g., as opposed to an address cycle and/or a data cycle). For instance, as illustrated at block 675, the previously selected memory volume (e.g., the memory device that includes the previously selected memory volume) is reselected responsive to the cycle type being an address cycle, data input cycle, or data output cycle. Also, as illustrated at block 675, previously assigned terminators for the reselected target memory volume are placed in a sniff state. That is, since the previously selected memory volume is reselected, those memory units previously assigned as terminators for the selected volume return to their previous state, which is a sniff state. As such, the memory units assigned as terminators for the selected volume monitor commands provided to the selected volume and perform ODT functions in appropriate circumstances. The terminators can be a number of memory units (e.g., LUNs) within the reselected target memory volume or within a number of memory units within an unselected target memory volume.

In the example illustrated in FIG. 6, if the cycle type is a command cycle (e.g., the controller performs a command cycle rather than an address or data cycle), then at block 670, a determination can be made as to the type of command provided by the system controller. In a number of embodiments, the command provided by the controller may indicate a target memory volume within a particular one of the number of memory devices targeted to execute a number of subsequent commands received thereto. In a number of embodiments, responsive to the command not indicating a target memory volume within a particular one of the number of memory devices, each of the number of memory devices return to their previous state. In various embodiments, the subsequent command(s) provided by the controller are to be executed by a particular memory unit associated with the indicated target memory volume within one of the number of memory devices.

In a number of embodiments, the previously selected memory volume is reselected unless the command issued by the controller and received by the number of memory volumes is a particular type of command. For instance, as illustrated at block 675, the previously selected memory volume (e.g., the memory device that includes the previously selected memory volume) is reselected responsive to the command being a command other than a volume select command (e.g., a command such as a read command, write command, erase command, or other command). As used herein, a volume select command refers to a command issued by the controller that indicates a volume address of a particular target memory volume to receive a subsequent command issued by the controller (e.g., a particular target memory volume that includes the memory unit for which the subsequent command is intended). In some embodiments, the volume select command is a first command provided by the system controller subsequent to activating the number of memory volumes via the switching of the chip enable signal from the high to the low state.

As illustrated at block 680, a particular target memory volume indicated by the command (e.g., the volume select command) is selected by the system controller. As such, the memory device having the selected target memory volume therein is activated and the remaining memory devices return to their respective previous states. As such, the selected target volume remains active and the number of memory units corresponding the selected target volume execute subsequent commands from the system controller until a subsequent deactivation of the selected target volume (e.g., due to a switching of the chip enable signal to a high state). Also, in a number of embodiments, terminators for the selected target volume can be placed in a sniff state while the selected target volume remains selected.

At block 685, the method 601 includes determining whether a memory unit is part of the currently selected target memory volume or whether the memory unit is in a sniff state. If the memory unit is not part of the currently selected target memory volume and is not in a sniff state, then as illustrated at block 690, the memory unit deselects and remains inactive until a next transition of the chip enable signal from the high to the low state. If the memory unit is part of the currently selected target memory volume, then as illustrated at block 695, the memory unit proceeds to execute the command, if applicable. Also, if the memory system includes an enabled on die termination function, then appropriate ODT actions for memory units of the selected volume can be performed. If it is determined that the memory unit is in a sniff state and is of an unselected target memory volume, then as illustrated at block 699, the memory unit can proceed to perform appropriate ODT actions for memory units on the unselected target memory volume. Embodiments of the present disclosure are not limited to the example illustrated in FIG. 6.

CONCLUSION

The present disclosure includes systems, devices, memory controllers, and methods for controlling memory. One such method includes activating a memory unit of a memory device; after activating the memory unit, providing a command to the memory device; and returning the memory unit to a previous state if the command does not indicate a target memory volume, wherein the memory unit remains active if the command indicates a target memory volume associated with the memory unit.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for controlling memory, comprising:
   activating a memory unit of a memory device;
   after activating the memory unit, determining a cycle type of a cycle issued by a controller coupled to the memory device;
   responsive to a determination that the cycle type is a command cycle:
   determining whether a command provided to the activated memory unit and corresponding to the command cycle is a volume select command;
   returning the memory unit to a previous state if it is determined that the command is not a volume select command such that the command does not indicate a target memory volume, wherein the memory unit remains active if it is determined that the command is a volume select command such that the command indicates a target memory volume associated with the memory unit; and
   responsive to a determination that the cycle type is at least one of an address cycle and a data cycle, reselecting a previously selected memory volume.

2. The method of claim 1, wherein returning the memory unit to a previous state if the command does not indicate a target memory volume includes returning the memory unit to a previous state if the command does not indicate a volume address.

3. The method of claim 1, further including deactivating the memory unit prior to activating the memory unit, wherein returning the memory unit to a previous state includes returning the memory unit to a state of the memory unit immediately prior to deactivating the memory unit.

4. The method of claim 1, wherein the previous state comprises an inactive state.

5. The method of claim 1, wherein the previous state comprises a snooping state.

6. The method of claim 1, further including placing a memory unit associated with a memory volume other than the target memory volume in a snooping state responsive to the command indicating the target memory volume.

7. The method of claim 1, wherein activating the memory unit includes providing an enable signal to the memory device, wherein the memory device shares the enable signal with other memory devices.

8. The method of claim 7, wherein activating the memory unit includes switching the shared enable signal from a first state to a second state.

9. The method of claim 7, wherein providing the enable signal includes providing the shared enable signal from an enable terminal of a controller to a respective enable terminal associated with the memory device.

10. A method for controlling memory, comprising:
    activating a number of memory volumes by switching an enable signal provided to a number of memory devices from a first state to a second state;
    determining a cycle type subsequently performed by a controller coupled to the number of memory devices;
    responsive to a determination that the cycle type is a command cycle:
    determining whether a command provided to the activated number of memory devices and corresponding to the command cycle is a volume select command;
    responsive to the command being a command other than a volume select command, a memory volume of the number of memory volumes that was previously active prior to switching the signal remains active; and
    responsive to the command being a volume select command, the memory volume indicated by the volume select command remains active; and
    responsive to a determination that the cycle type is not a command cycle, reselecting a previously selected memory volume.

11. The method of claim 10, including, responsive to the command being a volume select command, returning at least one of the memory volumes not indicated by the volume select command to its state prior to the switching of the signal.

12. The method of claim 10, including, responsive to the command being a command other than a volume select command, memory volumes of the number of memory volumes not previously active prior to switching the signal return to their respective states prior to the switching of the signal.

13. A method for operating a number of memory devices, each including one or more target memory volumes therein, the method comprising:
    activating a number of memory volumes of the number of memory devices responsive to detecting a switching of a signal from a first state to a second state;
    determining a cycle type subsequently issued by a controller coupled to the number of memory devices;
    responsive to a determination that the cycle type is a command cycle:
    determining whether a command subsequently provided to the activated number of memory volumes and corresponding to the command cycle is a volume select command;
    wherein, responsive to determining that the command is a volume select command such that the command indicates a target memory volume within a particular one of the number of memory devices, the particular one of the number of memory devices executes a subsequent command received thereto; and wherein, responsive to determining that the command is not a volume select command such that the command does not indicate a target memory volume within a particular one of the number of memory devices, each of the number of memory devices returns to a previous device state; and responsive to a determination that the cycle type is at least one of an address cycle and a data cycle, reselecting a previously selected memory volume.

14. The method of claim 13, including receiving the command via a bus shared by the number of memory devices.

15. The method of claim 14, including at least two of the number of memory devices receiving the signal from a single chip enable terminal of the controller coupled to the number of memory devices via the shared bus.

16. The method of claim 13, wherein, responsive to the command indicating a target memory volume within a particular one of the number of memory devices, at least one of the memory devices other than the particular one of the number of memory devices returns to its respective state prior to the detected switching.

17. A method for controlling memory, comprising:
activating a number of memory volumes each having a previous state associated therewith;
determining a cycle type subsequently issued by a controller coupled to the number of memory volumes;
responsive to a determination that the cycle type is a command cycle:
determining whether a command provided to the activated number of memory volumes and corresponding to the command cycle is a select command;
responsive to a determination that the command is a command other than a select command, a memory volume of the number of memory volumes whose previous state was active remains active; and
responsive to a determination that the command is a select command, the select command indicating an address of a selected one of the number of memory volumes to receive a subsequent command for execution, the memory volume indicated by the select command remains active; and
responsive to a determination that the cycle type is not a command cycle, reselecting a previously selected memory volume.

18. The method of claim 17, wherein activating a number of memory volumes includes activating the number of memory volumes via toggling an enable signal shared by the number of memory volumes from a first state to a second state.

19. The method of claim 18, including providing the enable signal to the number of memory volumes from the controller, wherein an enable terminal of the controller is coupled to a respective enable terminal of each of a number of memory devices.

20. The method of claim 19, wherein a number of memory units associated with the activated volumes share the enable signal within the number of memory devices.

21. The method of claim 19, wherein the enable terminal of the controller is a chip enable pin and the enable terminal of each of the number of memory devices is a chip enable pin, and wherein providing the enable signal includes providing a chip enable signal to the number of memory devices.

22. The method of claim 17, including providing a subsequent command for execution to the selected one of the number of memory volumes.

23. A memory controller, comprising:
a first interface for coupling to a host; and
a second interface for coupling to a number of memory devices, and wherein the memory controller is configured to:
activate a number of memory volumes of the number of memory devices by switching a shared signal provided thereto from a first state to a second state; and
issue a cycle to the activated number of memory devices;
wherein, responsive to the cycle being a command cycle:
the activated number of memory devices determine whether a command subsequently provided by the controller is a volume select command;
responsive to the command being a volume select command such that the command indicates one of the memory volumes, the one of the memory volumes remains active and executes a subsequent command received from the memory controller; and
responsive to the command not being a volume select command such that the command does not indicate any of the number of memory volumes, each of the number of memory volumes returns to its respective state prior to detecting the switching and
wherein, responsive to the cycle being at least one of an address cycle and a data cycle, a previously selected memory volume is reselected.

24. The memory controller of claim 23, wherein the shared signal is provided from a single chip enable terminal of the memory controller to a respective chip enable terminal of each of the number of memory devices.

* * * * *